July 31, 1956 — R. E. McAULEY — 2,756,946

FISHING LEADER HOLDER AND RECEPTACLE

Filed Jan. 14, 1954

Robert E. McAuley
INVENTOR

BY C. A. Snow & Co.
ATTORNEYS.

United States Patent Office 2,756,946
Patented July 31, 1956

2,756,946

FISHING LEADER HOLDER AND RECEPTACLE

Robert E. McAuley, Yakima, Wash.

Application January 14, 1954, Serial No. 404,093

1 Claim. (Cl. 242—138)

This invention relates to a fishing leader holder and more particularly to a fishing leader holder which may be easily carried by a fisherman even while wading in a stream or river or while fishing from a boat.

It is a principal object of this invention to provide a handy portable spool for a plurality of fishing leaders which the fisherman may wish to have handy to replace a broken leader.

It is another object of this invention to provide a fishing leader holder of the kind to be more particularly described hereinafter for holding a plurality of fishing leaders of the same, different or mixed kinds to be used by a fisherman any one of which may be easily removed without becoming entangled.

It is yet a further object of this invention to provide a fishing leader holder of this kind for adequately separating a plurality of leaders on the holder so that a selected leader may be easily unwound without tangling with any other leaders remaining on the holder.

It is a still further object of this invention to provide a portable spool type fishing leader holder of this kind which is easy to form and carry about while in use and just as easy to store in a receptacle when not in use. The spool and case are of a low cost for production and wide distribution.

Other and further objects and advantages of the invention will be hereinafter described and the novel features thereof defined in the appended claim.

Referring more specifically to the drawings the numeral 10 designates generally a fishing leader holder and receptacle to be used by a fisherman carrying leaders which may be used on the fishing line and when and if a leader should become broken during use.

Figure 1:
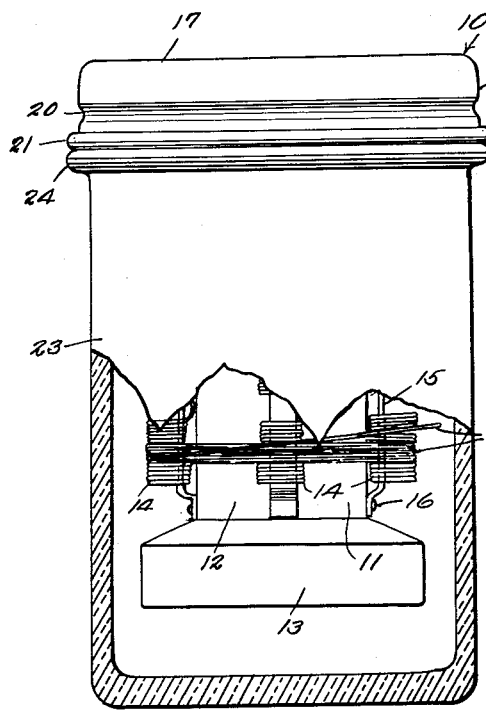
Fig. 1 is a side elevation, partly in section, of a spool and case constructed according to an embodiment of my invention.

The fishing leader holder and receptacle comprises a spool leader holder 11 having a central cylindrical body 12 with a circular disc 13 at each end thereof which discs may be formed integral with the central cylindrical body portion 12 or secured thereto by any suitable and acceptable fastening means. The discs 13 at the opposite ends of the cylindrical body 12 extend horizontally outwardly therefrom in the manner clearly shown in Figs. 1 and 3 of the drawings.

Longitudinally extending supporting bars 15 are secured at the opposite ends thereof by a nail 16 or other suitable fastening means, each supporting bar 15 having a plurality of thin wire coiled leader separators 14 secured thereon along the length of the bar so that a plurality of leaders may be supported on the spool, each leader being coiled around the spool and bars 15 between a pair of adjacent separators 14 whereby the leader as coiled around the body between the separators may be wound thereon and unwound when desired without becoming entangled with another leader also on the spool.

As the fisherman may desire to have more than one kind of leader for his fishing expedition, the separate types of leaders may be individually coiled around the cylindrical body 12 between adjacent or separated separators 14 so that a selected one of the leaders may be readily uncoiled from the holder without becoming entangled with any other leader also on the holder.

An inverted disc shape cover 17 is secured on one of the discs 13, which may be considered as the uppermost or top disc on the spool 11, the cover 17 being formed with a flat disc 18 which overlies the disc 13 onto which the cover is to be secured, the flat disc 18 being provided with a depending flange 19 around the peripheral edge thereof spaced outwardly from the peripheral edge of the disc 13.

The flange 19 is formed with a depression 20 annularly about the flat disc 18 and disposed therebelow. The depression 20 is formed intermediate the width of the flange 19 and a bead 21 is rolled outwardly from the extreme lower end of the flange 19 to be positioned below the depression 20 and the flat disc 18 and also below the disc 13 of the spool.

Figure 3:
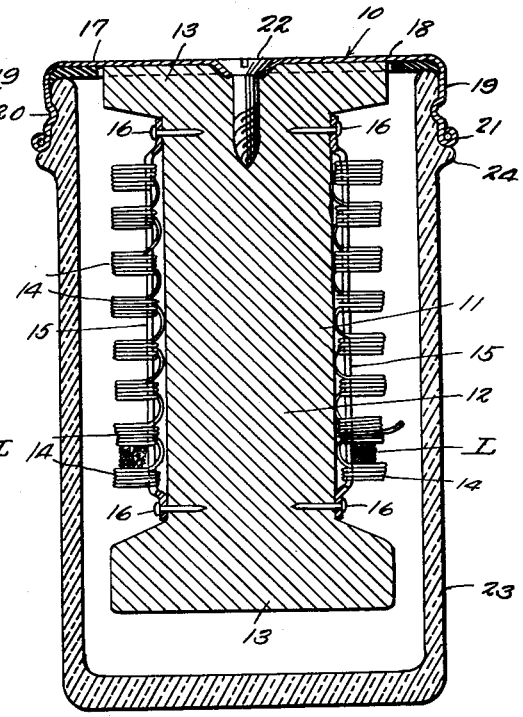
Fig. 3 is a vertical section taken through the spool and attached case.
Figure 2:
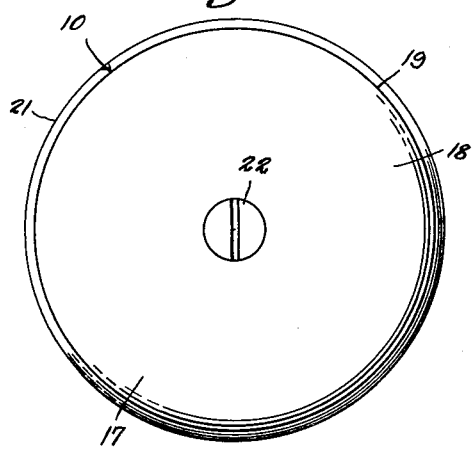
Fig. 2 is a top plan view thereof.
Figure 4:
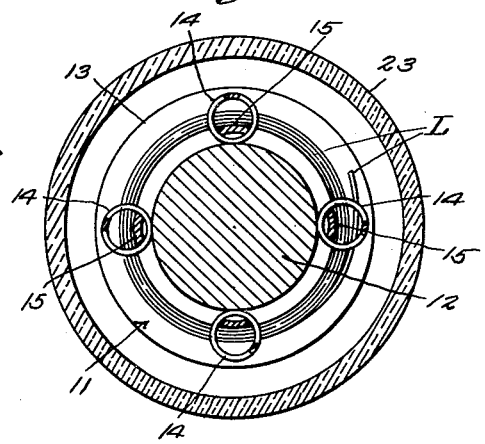
Fig. 4 is a horizontal transverse section through the holder and case.

A screw 22 is positioned at the center of the flat disc 18 to be threadably engaged through the uppermost disc 13 and into an end of the body 12 as clearly shown in Fig. 3 of the drawings.

A glass jar 23 is provided for enclosing the spool leader holder 11 by attachment to the cover 17 and flange 19 so that the various numbers of leaders can be readily seen from a position exteriorly of the spool leader holder 11 while the spool leader holder 11 is carried about by a fisherman or while the spool leader holder is placed in a selected position for storing.

The jar 23 is provided with an outwardly extending glass ring 24, formed integral with the jar 23, to be engaged below the bead 21 when the spool leader holder is encased within the jar and the cover 17 has been placed at the upper open end of the jar.

In the use and operation of the fishing leader holder and receptacle 10, the fishing leader holder 11 is removed from the jar 23 by the disengagement of the cover 17 therewith and a fishing leader L may then be trained about the body 12 and the bars 15 between a pair of adjacent thin coiled leader separators 14.

As a number of different leaders may be carried about by the spool leader holder 11 the leaders may be terminated outwardly from the separators 14 or the leaders may be engaged between the coils of the thin wire coiled leaders separators 14 so that the leaders will be detachably secured to the cylindrical body 12 for removal therefrom by unwinding or uncoiling the selected leader from the spool leader holder 11.

The bars 15 are formed of thin metal strips which may be concave on the inner side thereof adjacent to the cylindrical body 12 and convex on the other side thereof for engagement with the leaders carried on the cylindrical body of the spool leader holder.

While the specific details of one embodiment of this invention have been herein shown and described, the invention is not confined thereto as changes and alterations may be made without departing from the spirit and scope thereof as defined in the appended claim.

I claim:

A fishing leader holder comprising a cylindrical body, an annular flange at each end of said body, a plurality of springs disposed lengthwise of said body between said flanges and spaced circumferentially about said body, a clamping bar extending through each spring, means securing said bars to said body, each spring being formed of groups of spaced coils, the space between adjacent coils providing a space in which the leader is adapted to be wound with the ends of the leader pinched between adjacent convolutions of selected coils.

References Cited in the file of this patent
UNITED STATES PATENTS

| | | |
|---|---|---|
| 340,322 | Keep | Apr. 20, 1886 |
| 742,040 | Kurtz | Oct. 20, 1903 |
| 1,231,165 | Jay | June 26, 1917 |
| 1,855,285 | Fusch | Apr. 26, 1932 |
| 1,884,805 | Moritz | Oct. 25, 1932 |
| 2,080,805 | Brey | May 18, 1937 |
| 2,225,309 | Lawrence | Dec. 17, 1940 |
| 2,270,757 | Liska | Jan. 20, 1942 |
| 2,514,697 | Ellis | July 11, 1950 |
| 2,596,896 | Goad | May 13, 1952 |
| 2,619,299 | Chappius | Nov. 25, 1952 |
| 2,663,114 | Warner | Dec. 22, 1953 |
| 2,675,640 | Adamek | Apr. 20, 1954 |